L. PINTNER.
MEANS FOR FACILITATING THE PASSAGE OF CARS THROUGH CURVED RAILWAY LINES.
APPLICATION FILED AUG. 21, 1912.
1,064,167.
Patented June 10, 1913.
4 SHEETS—SHEET 1.
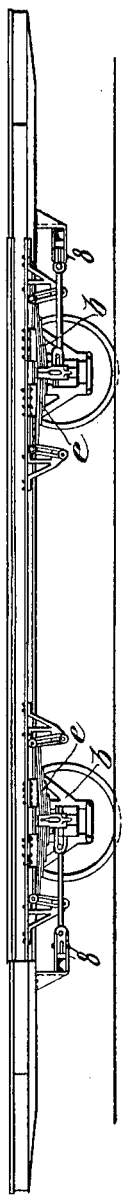
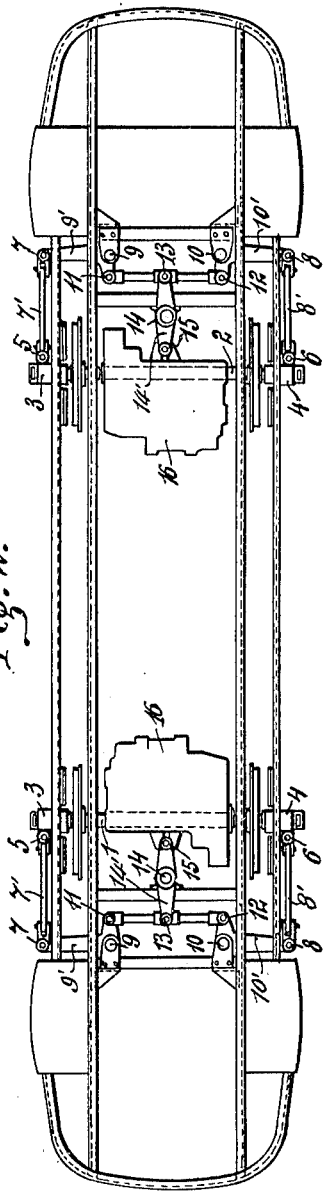

L. PINTNER.
MEANS FOR FACILITATING THE PASSAGE OF CARS THROUGH CURVED RAILWAY LINES.
APPLICATION FILED AUG. 21, 1912.
1,064,167.
Patented June 10, 1913.
4 SHEETS—SHEET 2.
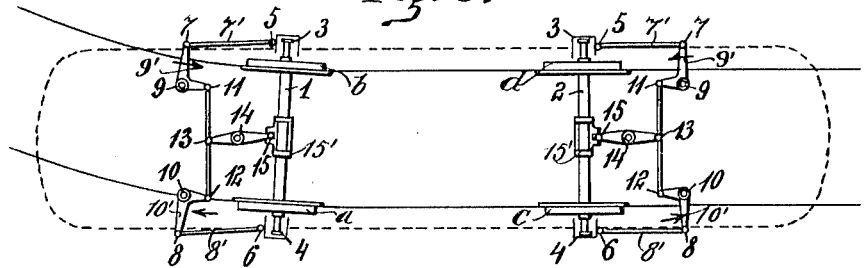
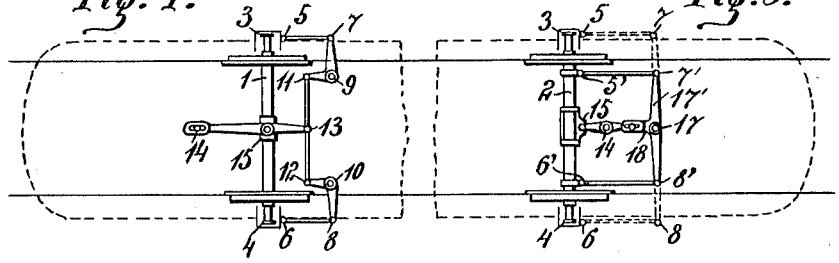
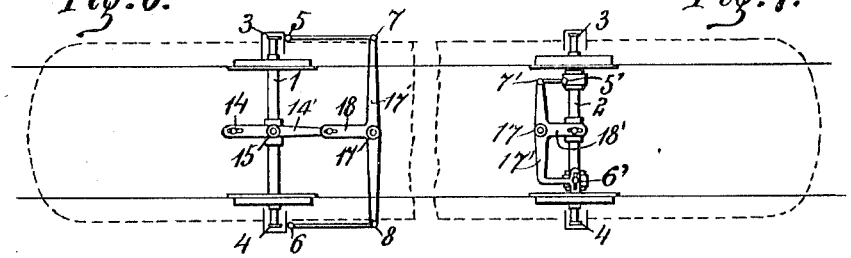
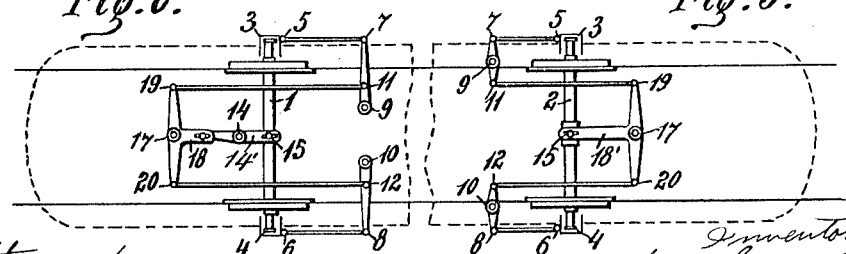

L. PINTNER.
MEANS FOR FACILITATING THE PASSAGE OF CARS THROUGH CURVED RAILWAY LINES.
APPLICATION FILED AUG. 21, 1912.
1,064,167.
Patented June 10, 1913.
4 SHEETS—SHEET 3.
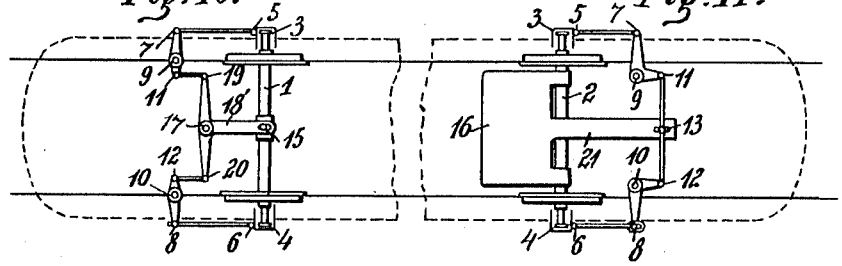
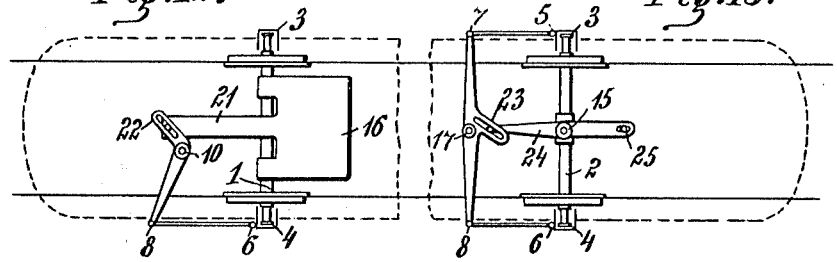
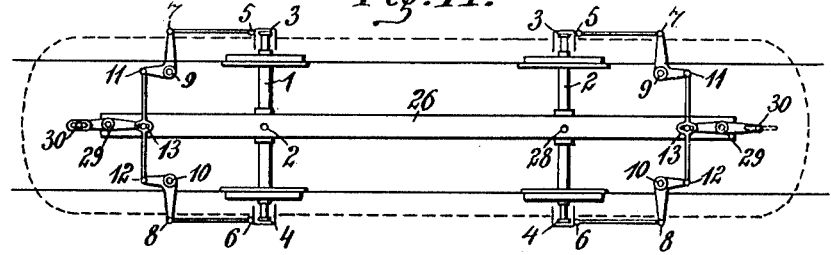
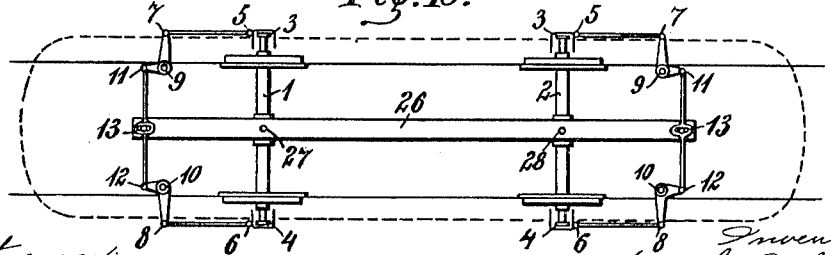

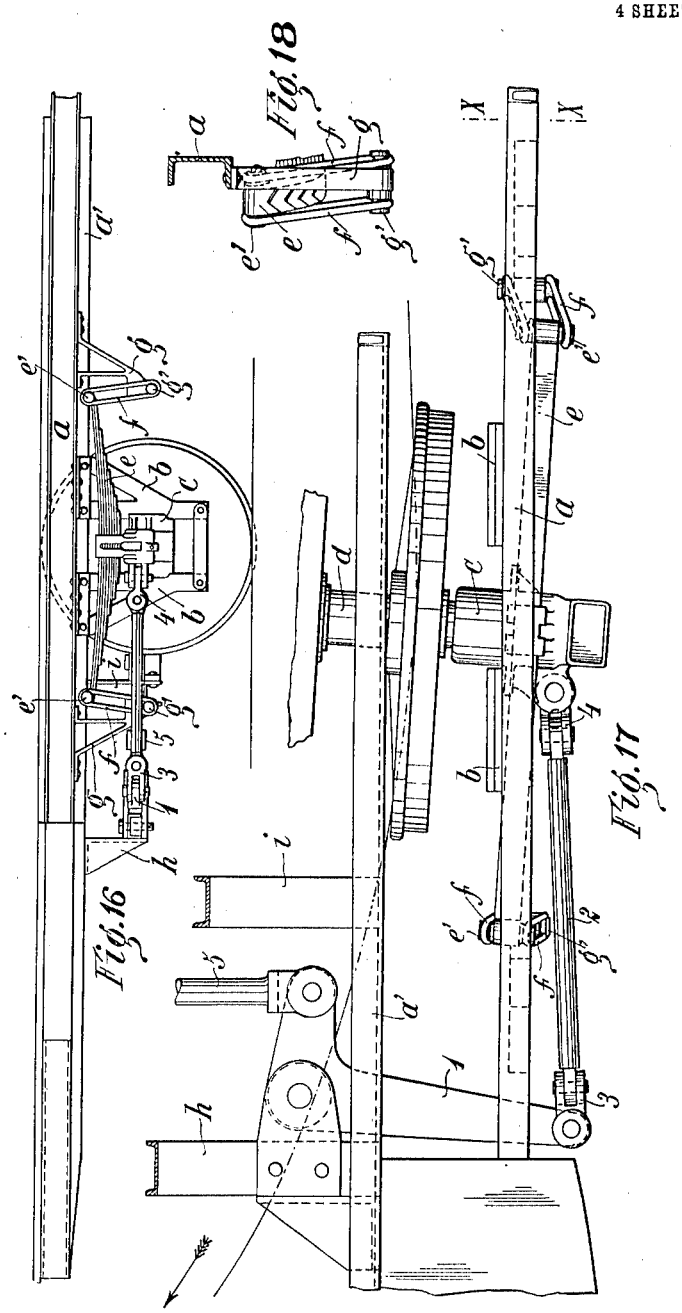

UNITED STATES PATENT OFFICE.

LUDVIK PINTNER, OF PRAGUE, AUSTRIA-HUNGARY.

MEANS FOR FACILITATING THE PASSAGE OF CARS THROUGH CURVED RAILWAY-LINES.

1,064,167.  Specification of Letters Patent.  Patented June 10, 1913.

Application filed August 21, 1912. Serial No. 716,284.

*To all whom it may concern:*

Be it known that I, LUDVIK PINTNER, subject of the Austro-Hungarian Emperor, residing at Prague, in the Kingdom of Bohemia, Austro-Hungarian Empire, have invented certain new and useful Improvements in Means for Facilitating the Passage of Cars Through Curved Railway-Lines, of which the following is a specification.

The object of this invention is to facilitate the negotiation of track curves by railway vehicles by automatic adjustment of the wheel axles.

The device of my invention is particularly advantageous in cases where the axles of the car are mounted on the car body and wherein trucks are not employed.

In accordance with my invention, the axial end thrust of the axles, with respect to the car body, is utilized for the purpose of actuating link mechanism to advance the radially outer end of the foremost axle, entering the curve, and to shift the radially innermost end of the axle rearwardly.

The device of my invention is illustrated in the accompanying drawings, in various embodiments, which will be more fully described in connection with the drawings and which will be more particularly pointed out in and by the appended claims.

In the drawings: Figure 1 is a view in side elevation showing one embodiment of my invention. Fig. 2 is a plan view thereof. Fig. 3 is a plan view of the preferred form shown in Figs. 1 and 2, and illustrating the operation when the front axle enters a curve. Fig. 4 is a plan view of a further embodiment of my invention. Fig. 5 is a plan view of another modification. Fig. 6 is a plan view of a still further modification. Fig. 7 is a plan view of a further modification. Fig. 8 is a plan view of a further modification. Fig. 9 is a plan view of a further modification. Fig. 10 is a plan view of a further modification. Fig. 11 is a plan view of a further modification. Fig. 12 is a plan view of a further modification. Fig. 13 is a plan view of a further modification. Fig. 14 is a plan view of a further modification. Fig. 15 is a plan view of a further modification. Fig. 16 is a detailed elevation of the forms shown in Figs. 1, 2 and 3. Fig. 17 is a detailed view taken in plan of that portion of the apparatus shown in Fig. 16 as it is beginning to enter a curve. Fig. 18 is a detailed sectional view taken on the line *x—x* of Fig. 17.

Like characters of reference designate similar parts throughout the different figures of the drawings.

In the preferred construction, shown in Figs. 1, 2 and 3, 1 and 2 designate the front and rear axles, although either may be the front axle in accordance with the direction in which the vehicle is running, and the axles are provided with wheels rigidly attached thereto and adapted to travel on rails, which are indicated by single lines. In accordance with my invention, trucks are not employed and the axles are mounted in pedestals *b* depending from the car body or frame, suitable suspension springs *e*, being mounted upon the bearing boxes 3 and 4 for suspending the car body. In the preferred construction, an axle operated lever is pivotally connected at 14, to the car body or frame. These levers, which are indicated at 14', are disposed outwardly with respect to the axles 1 and 2 as regards the ends of the car body. In Fig. 2, the inner ends of the levers 14' are pivotally connected at 15 with the motor casings 16. In Fig. 3 the levers 14' are pivotally connected at 15 to axle frame 15'. In either case, any axial thrust or endwise movement of the axles with respect to the car body, will serve to move or shift the levers 14' on their pivots 14. The outer ends of the levers 14' are pivoted at 13 to link bars which latter are pivoted at 11 and 12 to the ends of angles or bell crank levers 9' and 10'. Said levers 9' and 10' are mounted on vertical pivots 9 and 10 on the frame or car body and the outer free ends of the levers 9 and 10 are pivotally connected at 7 and 8, to links 7' and 8'. The links 7' and 8' are pivotally connected at 5 and 6 to bearing boxes 3 and 4 of the axles 1 and 2.

When the vehicle enters a track curve, as shown in Fig. 3, the centrifugal thrust of the vehicle, resulting from the tendency of the car body to continue in a straight line and the counter action of the curved rails causing the front axle to move longitudinally in a direction transverse to the car body, results in a relative movement of the axle 1 with respect to the car body. This endwise movement of the axle 1 turns the lever 14' on its pivot 14, which latter is carried by the car body, and this movement of the lever 14' shifts the link mechanism comprising the connected angle levers and the links 7' and 8'. Wheel a, which is the front and radially outermost wheel, as regards the track curve, will be advanced by movement of the lever 14' in the direction of the arrow shown in Fig. 3. The bell crank lever 10' will be moved in the direction indicated by its arrow and the bell crank lever 9' will be moved in the direction indicated by its arrow so that the radially outermost wheel a will be advanced and the radially innermost wheel b will be retracted. As regards the rear axle, the rear bell crank lever 10' will be moved in the direction of its arrow thereby shifting the radially outermost rear wheel c, rearwardly, and the rearmost bell crank lever 9' will be moved in the direction of its arrow thereby shifting the radially innermost rear wheel d, forwardly. When the vehicle reaches a straight stretch of track the foregoing operations will be reversed, and the axles will assume their normal transverse positions with respect to the longitudinal axis of the vehicle.

In Fig. 4, the pivot 14 is carried by the car body and the pivot 15 is rigidly carried by the axle 1. The pivotal connection 13 with the bell crank levers, at 11 and 12, and the pivotal mountings 9 and 10 of the bell crank levers and the connections 5, 7 and 8, with the bearing boxes 3 and 4, act in the manner set forth in connection with the preferred construction in Figs. 1, 2 and 3.

In Fig. 5, the bell crank levers are superseded by pivotally connecting the lever 14'' at 18 with a single three armed lever 17', which latter is pivotally mounted at 17 on the car body. The lever 14'' is pivotally mounted at 14 on the car body and is connected at 15 with the axle 2. The ends 7' and 8' of the lever 17' are connected with the axle 2 at 5' and 6', inside of the wheels. The dotted lines indicate how the connection can be effected to the bearing boxes 3 and 4, in a manner similar to the construction shown in Fig. 3.

Fig. 6 illustrates a form in which a lever 17', pivoted to the car body at 17, is slidably and pivotally connected at 18, to the lever 14', the latter being pivotally mounted at 15 on the axle 1. A slidable pivotal mounting 14 connects the free end of the lever 17' with the car body. The connections at 3, 4, 5, 6, 7 and 8 are similar to the connections shown in Fig. 3.

In the modification shown in Fig. 7 a lever 17' pivoted at 17 to the car body has one end connected at 7' to a link which connects with the axle 2 at 5', and the other end has a slot and pivot connection 6' with the axle 2. An extension 18' has a slidable pivotal connection with the axle 2.

In the form shown in Fig. 8 the boxes 3 and 4 are pivotally connected at 5 and 6 with links which latter are connected at 7 and 8 with levers pivoted at 9 and 10. The levers pivoted at 9 and 10 are connected at 11 and 12 by links which are pivoted at 19 and 20 on a three armed lever pivoted at 17. The pivots 9, 10 and 17 are carried by the car body. The three armed lever is provided with an extension 18 which has a slidable pivotal connection with one end of a lever 14', pivoted at 14 to the car body. The free end of the lever 14' has a sliding pivotal connection at 15 with the axle 1.

In the form shown in Fig. 9, a three armed lever is pivoted at 17 to the car body and has an extension 18' having a sliding pivotal connection at 15 with the axle 2. The three armed lever is pivotally connected at 19 and 20 by links which latter are pivoted at 11 and 12 to car body levers which are pivoted at 9 and 10. The car body levers are connected at 7 and 8 by links which latter are connected at 5 and 6 with the boxes 3 and 4.

In Fig. 10, the three armed lever pivoted to the car body at 17 is provided with an extension 18' having a slidable pivotal connection 15 with the axle 1. The free ends of the three armed lever are connected at 19 and 20 with links which latter are connected at 11 and 12 with car body levers pivoted at 9 and 10. The free ends of the car body levers are connected at 7 and 8 by links which latter are connected at 5 and 6 with boxes 3 and 4.

In the form shown in Fig. 11, the motor casing 16, mounted on the axle 2, is provided with an extension 21 which has a slidable pivotal connection at 13 with links connected at 11 and 12 with bell crank levers, which are pivoted to the body at 9 and 10. The free ends of the bell crank levers are connected at 7 and 8 by links which latter are connected at 5 and 6 with the boxes 3 and 4.

In Fig. 12, a motor casing 16, mounted on the axle 1, is provided with an extension 21 having a pin on the outer end thereof. A lever pivoted on the car body at 10 is provided with a slotted portion 22 engaging the pin of extension 21, and the free end of the lever is connected at 8 and 6 by a link with box 4 of the axle 1. This form of the invention illustrates the operation of the same where only one end of the axle is shifted, the other end taking up its corresponding position by reason of the positive shifting movement of the remaining end of the axle.

In Fig. 13 a lever pivoted to the car body at 17 is connected by links with the boxes 3 and 4, which links are pivoted at 5, 7, 6, 8 respectively. The lever has a slot 23 which has a sliding pivotal connection with the lever 24 pivoted at 15 on the axle 2. The lever 24 has a sliding pivotal connection at 25 with the car body.

In Fig. 14 a reach 26 is pivotally mounted at 27 and 28 on the axles 1 and 2 and at each end of the reach 26 are pivotally mounted levers 29. The outer ends of the levers have a pin and slot connection 30 with the car body. The inner ends of the levers have a pin and slot connection at 13 with the links connected at 11 and 12 with bell crank levers, the latter being pivoted on the car bodies at 9 and 10, and connected at 7 and 8 with links which latter are connected at 5 and 6 with boxes 3 and 4.

In Fig. 15 the construction is shown similar in all respects to Fig. 14 except in the omission of levers 29.

Referring more particularly to Figs. 16, 17 and 18, it will be seen that the journal boxes for the car axles are mounted between pedestals, such as $b$—$b$ extending from the outer sills $a$ of the car body. The bell levers such as 1 are pivoted to brackets such as $h$ which depend from the inner sills $a'$ of the car body. It will be seen moreover that the outer sills $a$ carry brackets such as $g$ from which the weight of the car body is transmitted to the springs $e$ by means of links such as $f$, the links $f$ being pivoted to the brackets $g$ at the points $g'$ and to the springs $e$ at the points $e'$. It will be seen more particularly in Fig. 17 that the journals 3 do not occupy the entire longitudinal distance between the brackets $b$—$b$ although from the view shown in Fig. 16 this entire space is covered by a laterally projecting flange outstanding from the journal 3.

From the foregoing it will be apparent that I have provided a construction whereby the axles may have an axial movement relatively to the car body. When the car strikes a curve the body of the car, owing to its inertia, is slower in accommodating itself to the constantly changing direction of movement than the axles. Moreover, when the wheels first strike a curve, they are displaced axially with reference to the car body, and both the relative movements just mentioned are utilized by means of the links such as 2 and 5 and the cranks such as 1 and 7, and change into a radial shifting movement so that the wheels are accommodated to the curve, as illustrated more particularly in Fig. 17. Particular attention is called to the position assumed by the springs $e$ and links $f$ in Figs. 17 and 18 as indicating the axial movement of the axle $d$ with respect to the car body. Of course in practice this axle movement is slight and scarcely visible but it has been somewhat exaggerated in these views to show the matter clearly.

In view of the fact that the modified forms of the invention operate the same as the preferred construction, the operation of which has been described, it is believed that the operation of the modified forms will be clear.

I claim.

1. In a railway vehicle, the combination with a car body, front and rear axles, levers pivoted to the car body and connected with the axle and adapted to be shifted by endwise movement of the axles with respect to the car body when entering a track curve, and link mechanism adapted for actuation by said levers for shifting the radially outermost end of the foremost axle forwardly and shifting the radially innermost end of the foremost axle rearwardly, substantially as described.

2. In a railway vehicle, the combination with a car body, front and rear axles therefor, front and rear levers pivoted to the front and rear axles and the car body each lever being adapted to be shifted by endwise movement of its respective axle upon entering a track curve, link mechanism connected with the front lever for shifting the radially outermost front wheel forwardly and shifting the radially innermost wheel rearwardly, and link mechanism connected with the rear lever for shifting the radially outermost wheel rearwardly and the radially innermost wheel forwardly, substantially as described.

3. In a railway vehicle, the combination with a car body, an axle therefor, means connected with and adapted for actuation by endwise movement of the axle relative to the car body when rounding a curve, and mechanism operated by said means for shifting the radially outermost end of the axle forwardly while rounding a curve, substantially as described.

4. In a railway vehicle, the combination with a car body, an axle therefor, means movably connected with the body and operatively connected with the axle for actuation by endwise movement of the axle relative to the car body when rounding a curve, and mechanism operated by said means for shifting the radially outermost end of the axle forwardly and the radially innermost end of the axle rearwardly, substantially as described.

In testimony whereof I affix my signature in presence of two witnesses.

LUDVIK PINTNER.

Witnesses:
JAN Z. VOJÁČEK,
ANTONIN VZOKOCIL.

Copies of this patent may be obtained for five cents each, by addressing the "Commissioner of Patents, Washington, D. C."